(12) United States Patent
Lin

(10) Patent No.: US 7,270,435 B2
(45) Date of Patent: Sep. 18, 2007

(54) MOBILE PHONE HOLDER

(75) Inventor: Michael Lin, Chungho (TW)

(73) Assignee: Beta Emblems & Dies Co., Ltd., Taipei Hsien (TW)

( * ) Notice: Subject to any disclaimer, the term of this patent is extended or adjusted under 35 U.S.C. 154(b) by 92 days.

(21) Appl. No.: 11/206,971

(22) Filed: Aug. 19, 2005

(65) Prior Publication Data

US 2007/0041192 A1   Feb. 22, 2007

(51) Int. Cl.
*H04M 1/22* (2006.01)

(52) U.S. Cl. .......................... 362/88; 379/446; 362/276

(58) Field of Classification Search ............... 362/191, 362/88, 276; 379/446
See application file for complete search history.

(56) References Cited

U.S. PATENT DOCUMENTS 5,825,874 A * 10/1998 Humphreys et al. ........ 379/446
6,084,963 A * 7/2000 Hirai et al. ................. 379/446
2005/0237735 A1* 10/2005 Fan ............................ 362/191

* cited by examiner

*Primary Examiner*—Sandra O'Shea
*Assistant Examiner*—James W Cranson, Jr.
(74) *Attorney, Agent, or Firm*—Harness, Dickey & Pierce, P.L.C.

(57) ABSTRACT

A mobile phone holder includes: a bottom plate having a first coupling part; a top plate having a second coupling part; and a light emitting unit mounted on the top plate. The top plate is connected movably to the bottom plate, and is movable between an unfolded position and a folded position, where the top plate is disposed above the bottom plate and cooperates with the bottom plate to confine a receiving space. The top plate is formed with an access hole in spatial communication with the receiving space when the top plate is disposed at the folded position, thereby permitting insertion of a mobile phone into the receiving space via the access hole. The second coupling part is capable of removable engagement with the first coupling part when the top plate is disposed at the folded position, thereby retaining releasably the top plate at the folded position.

8 Claims, 3 Drawing Sheets

MOBILE PHONE HOLDER

BACKGROUND OF THE INVENTION

1. Field of the Invention

The invention relates to a mobile phone holder, particularly to a mobile phone holder that is both foldable and easy to manufacture, and that is provided with a ring alert feature.

2. Description of the Related Art

A first type of conventional mobile phone holders is not foldable, and cannot be stored conveniently. A second type of conventional mobile phone holders is formed like a miniature folding chair, which is not easy to produce. In addition, both the first and second conventional mobile phone holders do not have additional functions other than holding a mobile phone.

SUMMARY OF THE INVENTION

Therefore, the object of the present invention is to provide a mobile phone holder that is both foldable and easy to manufacture, and that is provided with a ring alert feature.

According to the present invention, there is provided a mobile phone holder that includes: a bottom plate having a first edge, a second edge opposite to the first edge, and a first coupling part disposed proximate to the second edge; a top plate having a third edge disposed adjacent to the first edge of the bottom plate, a fourth edge opposite to the third edge, and a second coupling part disposed proximate to the fourth edge; and a light emitting unit mounted on the top plate. The top plate is connected movably to the bottom plate at the first and third edges, and is movable between an unfolded position and a folded position, where the top plate is disposed above the bottom plate and cooperates with the bottom plate to confine a receiving space. The top plate is formed with an access hole in spatial communication with the receiving space when the top plate is disposed at the folded position, thereby permitting insertion of a mobile phone into the receiving space via the access hole. The second coupling part is capable of removable engagement with the first coupling part when the top plate is disposed at the folded position, thereby retaining releasably the top plate at the folded position.

BRIEF DESCRIPTION OF THE DRAWINGS

Other features and advantages of the present invention will become apparent in the following detailed descriptions of the preferred embodiments with reference to the accompanying drawings of which.

DETAILED DESCRIPTION OF THE PREFERRED EMBODIMENTS

Figure 1:
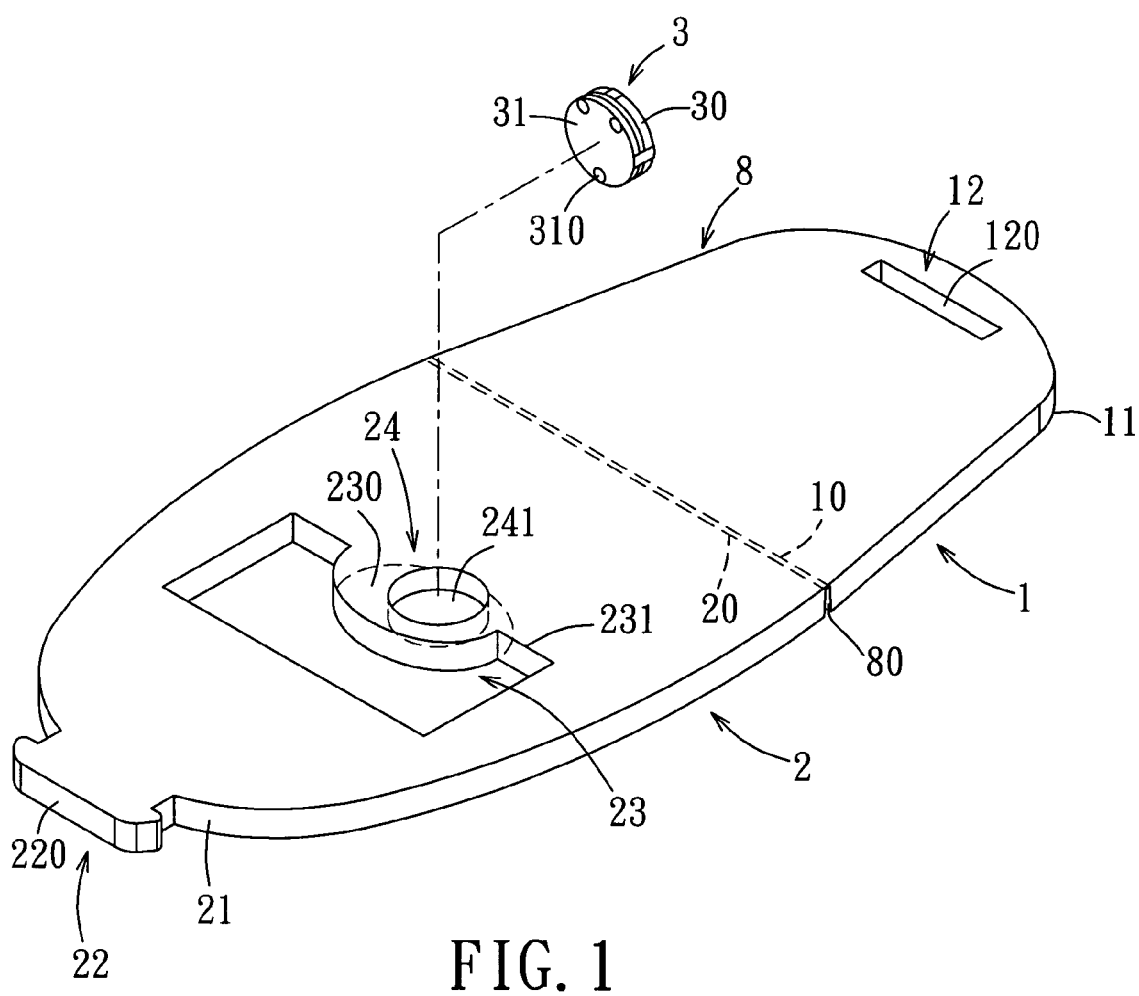
FIG. 1 is a perspective view of the first preferred embodiment of a mobile phone holder according to the present invention, illustrating an unfolded state thereof.

Before the present invention is described in greater detail, it should be noted herein that like elements are denoted by the same reference numerals throughout the disclosure.

Figure 2:
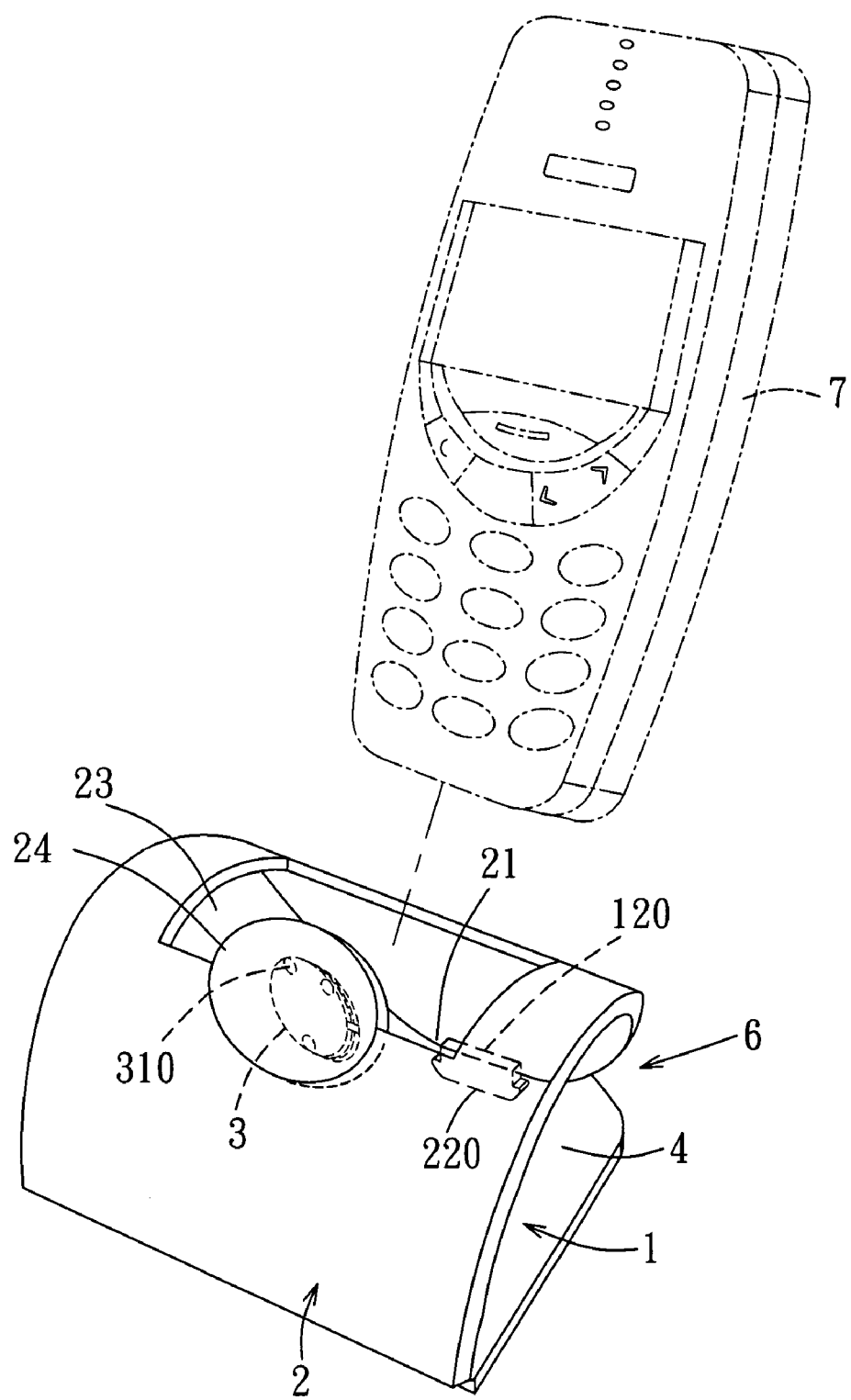
FIG. 2 is a perspective view of the first preferred embodiment, illustrating a folded state thereof.

As shown in FIG. 1 and FIG. 2, the first preferred embodiment of a mobile phone holder according to the present invention includes a bottom plate 1, a top plate 2, and a light emitting unit 3. The bottom plate 1 has a first edge 10, a second edge 11 opposite to the first edge 10, and a first coupling part 12 disposed proximate to the second edge 11. The top plate 2 has a third edge 20 disposed adjacent to the first edge 10 of the bottom plate 1, a fourth edge 21 opposite to the third edge 20, and a second coupling part 22 disposed proximate to the fourth edge 21. The light emitting unit 3 is mounted on the top plate 2.

Figure 3:
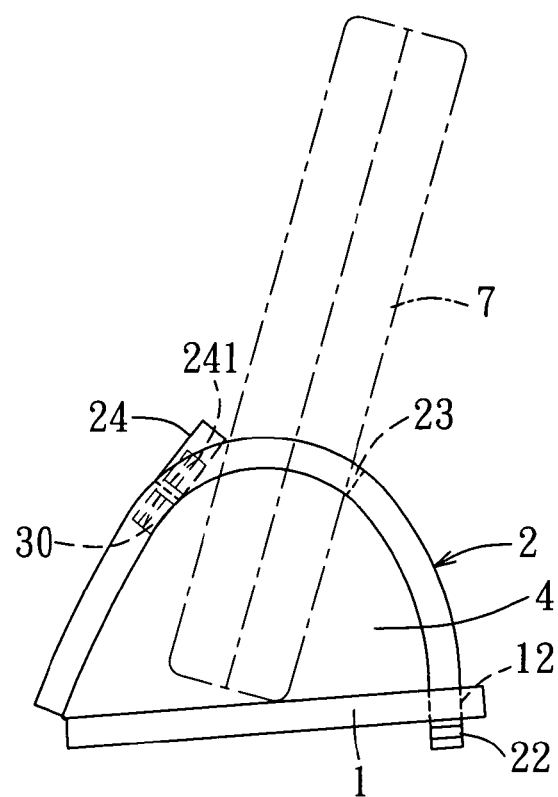
FIG. 3 is a side view of the first preferred embodiment when in the folded state.

The top plate 2 is connected movably to the bottom plate 1 at the first and third edges 10, 20, and is movable between an unfolded position (illustrated in FIG. 1) and a folded position (illustrated in FIG. 2). In the folded position, the top plate 2 is disposed above the bottom plate 1 and arches so as to cooperate with the bottom plate 1 to confine a receiving space (as best shown in FIG. 3). The top plate 2 is further formed with an access hole 23, and a holder part 24 connected integrally to a periphery of the access hole 23 for retaining the light emitting unit 3 on the top plate 2. The access hole 23 is in spatial communication with the receiving space 4 when the top plate 2 is disposed at the folded position, thereby permitting insertion of a mobile phone 7 into the receiving space 4 via the access hole 23. The top plate 2 has a length such that, when the mobile phone 7 is received in the receiving space 4, an upper half section of the mobile phone 7 is exposed from the access hole 23 to facilitate removal of the mobile phone 7 from the mobile phone holder.

In this preferred embodiment, the access hole 23 is a rectangular hole. The holder part 24 projects from an edge 231 of the access hole 23, and is formed with a circular pocket opening 241 that is slightly expandable.

The second coupling part 22 is capable of removable engagement with the first coupling part 12 when the top plate 2 is disposed at the folded position, thereby retaining releasably the top plate 2 at the folded position. In this preferred embodiment, the first coupling part 12 is formed with an elongated slot 120, and the second coupling part 22 is formed with a T-shaped member 220 that extends integrally from the fourth edge 21 of the top plate 2 and that is capable of releasable engagement with the elongated slot 120.

In this preferred embodiment, the light emitting unit 3 includes a control unit 30, and a circuit board 31 having a plurality of light emitting diodes (LEDs) 310 mounted thereon. The circuit board 31 is mounted on and is connected electrically to the control unit 30. The light emitting unit 3 is inserted into the holder part 24 via the pocket opening 241. The control unit 30 faces toward the receiving space 4 when the top plate 2 is disposed at the folded position, such that when the mobile phone 7 receives an incoming call or message, the control unit 30 is able to detect an audible ring tone generated by the mobile phone 7 and to control the LEDs 310 to generate a visible alert output in response to the detected ring tone. Since the feature of this invention does not reside in the control unit 30, which is known in the art, further details of the same are omitted herein for the sake of brevity.

In this preferred embodiment, the bottom and top plates 1, 2 are made from a transparent and flexible material, such as PU or PP. The third edge 20 of the top plate 2 is hinged to the first edge 10 of the bottom plate 1. As shown in FIG. 1 this can be accomplished by using a flexible blank 8 having an underside that is formed with a blind slit 80, thereby configuring the flexible blank 8 with the top and bottom plates 1, 2. The top plate 2 is longer than the bottom plate 1 in a direction transverse to the slit 80. The slit 80 is disposed at a position corresponding to the first and third edges 10, 20, such that the top and bottom plates 1, 2 are hinged together at the first and third edges 10, 20.

Figure 4:
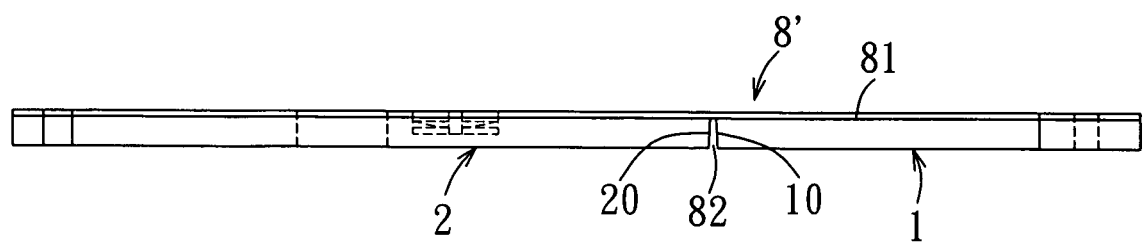
FIG. 4 is a side view of the second preferred embodiment of a mobile phone holder according to the present invention when in the unfolded state.

As shown in FIG. 4, the second preferred embodiment of a mobile phone holder according to the present invention further comprises a flexible lining layer 8' having a side 81 that is attached to surfaces of the top and bottom plates 1, 2 to connect movably the top plate 2 to the bottom plate 1. The top plate 2 is made from a flexible material, and the first and third edges 10, 20 form a gap 82 therebetween. Therefore, unlike the previous embodiment, the top and bottom plates 2, 1 of this embodiment may be fabricated separately.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A mobile phone holder comprising:

a bottom plate having a first edge, a second edge opposite to said first edge, and a first coupling part disposed proximate to said second edge;

a top plate having a third edge disposed adjacent to said first edge of said bottom plate, a fourth edge opposite to said third edge, and a second coupling part disposed proximate to said fourth edge;

said top plate being connected movably to said bottom plate at said first and third edges and being movable between an unfolded position and a folded position, where said top plate is disposed above said bottom plate and cooperates with said bottom plate to confine a receiving space;

said top plate being formed with an access hole in spatial communication with said receiving space when said top plate is disposed at the folded position, thereby permitting insertion of a mobile phone into said receiving space via said access hole;

said second coupling part being capable of removable engagement with said first coupling part when said top plate is disposed at the folded position, thereby retaining releasably said top plate at the folded position; and a light emitting unit mounted on said top plate.

2. The mobile phone holder as claimed in claim 1, wherein said light emitting unit is adapted for generating a visible alert output in response to an audible ring tone generated by the mobile phone that is received in said receiving space, and detected by said light emitting unit.

3. The mobile phone holder as claimed in claim 1, wherein said first coupling part is formed with an elongated slot, and said second coupling part is formed with a T-shaped member capable of releasable engagement with said elongated slot.

4. The mobile phone holder as claimed in claim 1, wherein each of said bottom plate and said top plate is made from a transparent and flexible material.

5. The mobile phone holder as claimed in claim 1, wherein said third edge of said top plate is hinged to said first edge of said bottom plate.

6. The mobile phone holder as claimed in claim 1, comprising a flexible blank having an underside that is formed with a blind slit, thereby configuring said flexible blank with said top and bottom plates, said top plate being longer than said bottom plate in a direction transverse to said slit, said slit being disposed at a position corresponding to said first and third edges such that said top and bottom plates are hinged together at said first and third edges.

7. The mobile phone holder as claimed in claim 1, wherein:

said top plate is made from a flexible material;

said first and third edges forming a gap therebetween;

said mobile phone holder further comprising a flexible lining layer attached to surfaces of said top and bottom plates to connect movably said top plate to said bottom plate.

8. The mobile phone holder as claimed in claim 1, wherein said top plate is further formed with a holder part at a periphery of said access hole for retaining said light emitting unit on said top plate.

* * * * *